US011470615B2

(12) United States Patent
Abedini et al.

(10) Patent No.: US 11,470,615 B2
(45) Date of Patent: Oct. 11, 2022

(54) RESOURCE AVAILABILITY INDICATION

(71) Applicant: QUALCOMM Incorporated, San Diego, CA (US)

(72) Inventors: Navid Abedini, Somerset, NJ (US); Jianghong Luo, Skillman, NJ (US); Karl Georg Hampel, Hoboken, NJ (US); Luca Blessent, Whitehouse Station, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 16/817,443

(22) Filed: Mar. 12, 2020

(65) Prior Publication Data

US 2020/0305166 A1    Sep. 24, 2020

Related U.S. Application Data

(60) Provisional application No. 62/822,785, filed on Mar. 22, 2019.

(51) Int. Cl.
*H04W 72/04* (2009.01)
*H04W 8/24* (2009.01)

(52) U.S. Cl.
CPC ....... *H04W 72/0486* (2013.01); *H04W 8/245* (2013.01); *H04W 72/042* (2013.01); *H04W 72/0446* (2013.01); *H04W 72/0493* (2013.01)

(58) Field of Classification Search
CPC ............. H04W 72/0486; H04W 8/245; H04W 72/042; H04W 72/0446; H04W 72/0493; H04W 28/16
See application file for complete search history.

(56) References Cited

U.S. PATENT DOCUMENTS

| 2016/0127913 | A1* | 5/2016  | Li       | H04W 72/042 |
|              |     |         |          | 370/329     |
| 2017/0208621 | A1* | 7/2017  | Dutta    | H04W 72/1289 |
| 2017/0272992 | A1* | 9/2017  | Fujishiro | H04W 72/02 |
| 2017/0332359 | A1* | 11/2017 | Tsai     | H04B 7/0617 |
| 2018/0270713 | A1* | 9/2018  | Park     | H04L 5/0053 |
| 2018/0309513 | A1* | 10/2018 | Kim      | H04B 7/2643 |

(Continued)

FOREIGN PATENT DOCUMENTS

| WO | 2017124046    A1  | 7/2017 |              |
| WO | WO-2017124046 A1* | 7/2017 | H04W 72/1231 |

OTHER PUBLICATIONS

International Search Report and Written Opinion—PCT/US2020/099678—ISA/EPO—Jul. 26, 2021.

(Continued)

*Primary Examiner* — Jael M Ulysse

(74) *Attorney, Agent, or Firm* — Harrity & Harrity, LLP

(57) ABSTRACT

Various aspects of the present disclosure generally relate to wireless communication. In some aspects, a central unit (CU) may determine a set of resources that is unavailable for use by a distributed unit (DU) of the CU, the set of resources including one or more resources. The CU may transmit information identifying the set of resources that is unavailable for use by the DU to cause an inferior node of the DU to refrain from using the set of resources that is unavailable for use by the DU. Numerous other aspects are provided.

30 Claims, 10 Drawing Sheets

(56) References Cited

U.S. PATENT DOCUMENTS

| | | | | |
|---|---|---|---|---|
| 2018/0310335 | A1* | 10/2018 | Tang | H04W 76/27 |
| 2018/0367273 | A1* | 12/2018 | Park | H04W 72/046 |
| 2018/0367289 | A1* | 12/2018 | Kim | H04L 5/0096 |
| 2019/0053227 | A1* | 2/2019 | Huang | H04W 72/0446 |
| 2019/0059039 | A1* | 2/2019 | Centonza | H04W 76/19 |
| 2019/0104435 | A1* | 4/2019 | Cho | H04W 74/08 |
| 2019/0149365 | A1* | 5/2019 | Chatterjee | H04L 5/0048 370/329 |
| 2019/0150123 | A1* | 5/2019 | Nogami | H04L 5/0053 370/330 |
| 2019/0150124 | A1* | 5/2019 | Nogami | H04L 5/0094 370/330 |
| 2019/0182840 | A1* | 6/2019 | Feng | H04W 72/06 |
| 2019/0239123 | A1* | 8/2019 | Kim | H04W 74/0833 |
| 2019/0349079 | A1* | 11/2019 | Novlan | H04B 7/2606 |
| 2019/0349898 | A1* | 11/2019 | Fu | H04W 72/044 |
| 2020/0045597 | A1* | 2/2020 | Tidestav | H04W 36/0085 |
| 2020/0112879 | A1* | 4/2020 | Shimoda | H04L 1/06 |
| 2020/0229271 | A1* | 7/2020 | You | H04W 56/001 |
| 2021/0127453 | A1* | 4/2021 | You | H04W 72/042 |
| 2021/0385850 | A1* | 12/2021 | Yoshioka | H04W 72/1268 |

OTHER PUBLICATIONS

International Search Report and Written Opinion—PCT/US2020/022678—ISA/EPO—Jun. 26, 2020.

Qualcomm Incorporated: "IAB Resource Management", 3GPP Draft, 3GPP TSG RAN WG1 Meeting #94, R1-1809444, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, 20180820-20180824, Aug. 17, 2018 (Aug. 17, 2018), 6 Pages, XP051516809, Retrieved from the Internet: URL: http://www.3gpp.org/ftp/tsg%5Fran/WG1%5FRL1/TSGR1%5F94/Docs/R1 %2D1809444%2Ezip [retrieved on Aug. 17, 2018], pp. 2-5, 2.1 Baseline.

Qualcomm Incorporated: "IAB Resource Management Framework," 3GPP Draft, 3GPP TSG RAN WG1 Meeting AH1901, R1-1900881, IAB Resource Management Framework, 3rd Generation Partnership Project (3GPP), Mobile Competence Centre, 650, Route Des Lucioles, F-06921, Sophia-Antipolis Cedex, France, vol. RAN WG1. No. Taipei. Taiwan; 20190121-20190125, Jan. 20, 2019 (Jan. 20, 2019), XP051593727, 8 pages, Retrieved from the Internet: URL: http://www.3gpp.org/ftp/Meetings%5F3GPP%5FSYNC/RAN1/Docs/R1%2D1900881%2Ezip.

Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Lucioles, F-06921 Sophia-Antipolis Cedex, France, vol. RAN WG1, No. Chengdu, China, 20181008-20181012, Sep. 29, 2018 (Sep. 29, 2018), XP051518661, 8 pages, Retrieved from the Internet URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5.

* cited by examiner

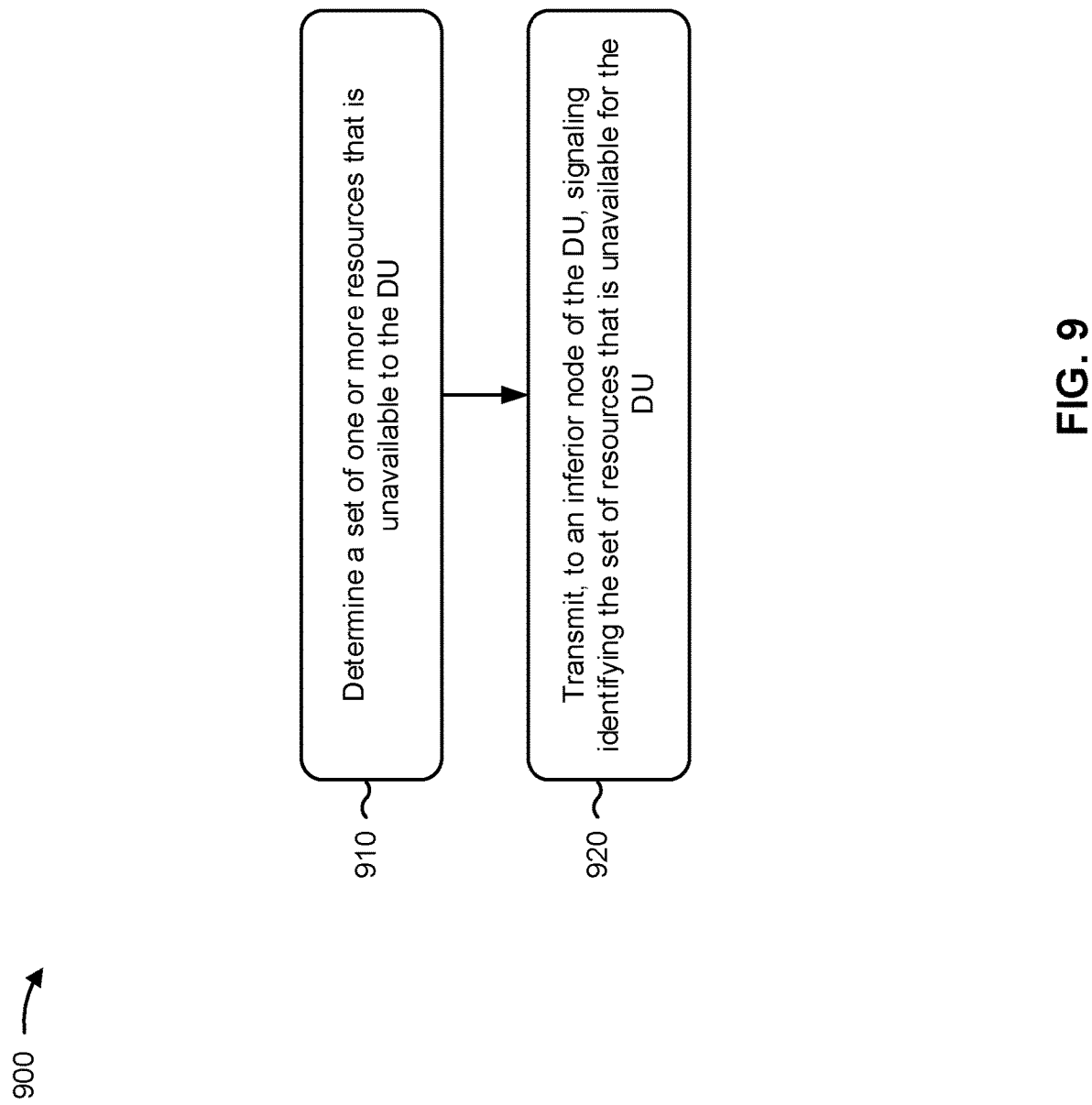

RESOURCE AVAILABILITY INDICATION

CROSS-REFERENCE TO RELATED APPLICATION

This Patent Application claims priority to U.S. Provisional Patent Application No. 62/822,785, filed on Mar. 22, 2019, entitled "RESOURCE AVAILABILITY INDICATION," and assigned to the assignee hereof. The disclosure of the prior Application is considered part of and is incorporated by reference in this Patent Application.

INTRODUCTION

Aspects of the present disclosure generally relate to wireless communication, and to techniques and apparatuses for management of communication resources.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a central unit (CU), may include determining a set of one or more resources that is unavailable for use by a distributed unit (DU) of the CU and transmitting, to the DU and toward an inferior node configured to use the set of resources, information to indicate that the set of resources is unavailable.

In some aspects, a method of wireless communication, performed by a wireless node, may include receiving an updated slot format indicator (SFI) to override a previous SFI. The method may include identifying a set of one or more resources that is unavailable for a DU that is a superior node to the wireless node based at least in part on the updated SFI. The method may include refraining from using the set of resources based at least in part on receiving the signaling.

In some aspects, a method of wireless communication, performed by a DU, may include determining a set of one or more resources that is unavailable to the DU and transmitting, to an inferior node of the DU, signaling identifying the set of resources that is unavailable for the DU.

In some aspects, a wireless node for wireless communication may include a memory and one or more processors coupled to the memory. The memory and the one or more processors may be configured to receive an updated SFI to override a previous SFI. The memory and the one or more processors may be configured to identify a set of one or more resources that is unavailable for a DU that is a superior node to the wireless node based at least in part on the updated SFI. The memory and the one or more processors may be configured to refrain from using the set of resources based at least in part on receiving the signaling.

In some aspects, a CU for wireless communication may include a memory and one or more processors coupled to the memory. The memory and the one or more processors may be configured to determine a set of one or more resources that is unavailable for use by a DU of the CU. The memory and the one or more processors may be configured to transmit, to the DU and toward an inferior node configured to use the set of resources, information to indicate that the set of resources is unavailable.

In some aspects, a wireless node for wireless communication may include a memory and one or more processors coupled to the memory. The memory and the one or more processors may be configured to receive an updated slot format indicator (SFI) to override a previous SFI. The memory and the one or more processors may be configured to identify a set of one or more resources that is unavailable for a DU that is a superior node to the wireless node based at least in part on the updated SFI. The memory and the one or more processors may be configured to refrain from using the set of resources based at least in part on receiving the signaling.

In some aspects, a DU for wireless communication may include a memory and one or more processors coupled to the memory. The memory and the one or more processors may be configured to determine a set of one or more resources that is unavailable to the DU. The memory and the one or more processors may be configured to transmit, to an inferior node of the DU, signaling identifying the set of resources that is unavailable for the DU.

In some aspects, a non-transitory computer-readable medium may store one or more instructions for wireless communication. The one or more instructions, when executed by one or more processors of a CU, may cause the one or more processors to determine a set of one or more resources that is unavailable for use by a DU of the CU; and transmit, to the DU and toward an inferior node configured to use the set of resources, information to indicate that the set of resources is unavailable.

In some aspects, a non-transitory computer-readable medium may store one or more instructions for wireless communication. The one or more instructions, when executed by one or more processors of a wireless node, may cause the one or more processors to receive an updated SFI to override a previous SFI. The one or more instructions, when executed by one or more processors of a wireless node, may cause the one or more processors to identify a set of one or more resources that is unavailable for a DU that is a superior node to the wireless node based at least in part on the updated SFI. The one or more instructions, when executed by one or more processors of a wireless node, may cause the one or more processors to refrain from using the set of resources based at least in part on receiving the signaling.

In some aspects, a non-transitory computer-readable medium may store one or more instructions for wireless communication. The one or more instructions, when executed by one or more processors of a DU, may cause the one or more processors to determine a set of one or more resources that is unavailable to the DU. The one or more instructions, when executed by one or more processors of a DU, may cause the one or more processors to transmit, to an inferior node of the DU, signaling identifying the set of resources that is unavailable for the DU.

In some aspects, an apparatus for wireless communication may include means for determining a set of one or more resources that is unavailable for use by a DU of the apparatus and means for transmitting, to the DU and toward an inferior node configured to use the set of resources, information to indicate that the set of resources is unavailable.

In some aspects, an apparatus for wireless communication may include means for receiving an updated SFI to override a previous SFI. The apparatus may include means for identifying a set of one or more resources that is unavailable for a distributed unit (DU) that is a superior node to the apparatus based at least in part on the updated SFI. The apparatus may include means for refraining from using the set of resources based at least in part on receiving the signaling.

In some aspects, an apparatus for wireless communication may include means for determining a set of one or more resources that is unavailable to the apparatus and means for transmitting, to an inferior node of the apparatus, signaling identifying the set of resources that is unavailable for the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a DU, in accordance with various aspects of the present disclosure.

DETAILED DESCRIPTION

Figure 1:
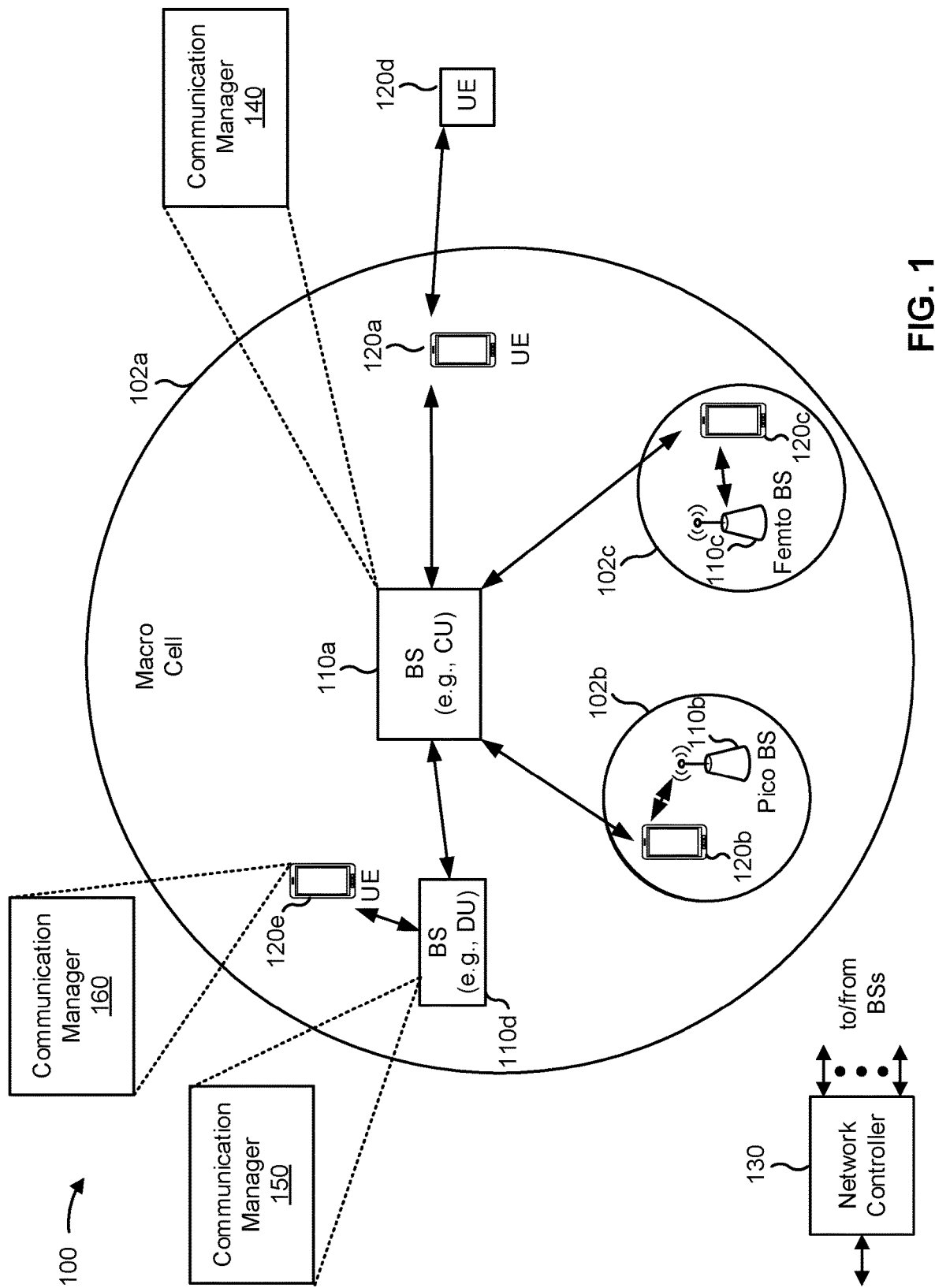
FIG. 1 is a block diagram conceptually illustrating an example of a wireless communication network, in accordance with various aspects of the present disclosure.

In some communications systems, such as 5G communications systems that use multi-hop networks (e.g., integrated access and backhauling (IAB)), a central unit (CU)—distributed unit (DU) architecture may be used. For example, an IAB-donor may be hierarchically connected to a set of IAB-nodes, a set of UEs, and/or the like. In one or more examples, the IAB-donor may include a CU that semi-statically allocates resources to DUs of the set of IAB-nodes via an F1-AP interface. The CU may be an IAB-node, itself, or a portion of an IAB-node (e.g., that communicates with a core network) and the DU may be an IAB-node, itself, or a portion of an IAB-node (e.g., the same IAB-node as the CU or a different IAB-node) that communicates downstream with one or more other IAB-nodes. A DU may dynamically schedule for child links within semi-static resources. The child links may represent communication links with child nodes, also termed inferior nodes, of the DU, as described in more detail herein. For example, a first DU may schedule for a second DU or for a UE that is hierarchically inferior to the first DU using dynamic signaling. Further, in one or more examples, the first DU may dynamically release resources allocated to the first DU for use by the second DU when the first DU determines that the first DU does not need to use the resources.

When a set of resources (e.g., one or more resources) is unavailable to a DU, such as when a CU does not allocate the set of resources to the DU or when another DU, to which the DU is an inferior node, does not release the set of resources to the DU, the DU may not attempt to communicate with a wireless node (e.g., an inferior node, such as a UE or a mobile terminal (MT)) using the set of resources. However, if the wireless node does not receive an indication that the set of resources is unavailable to the DU, the wireless node may attempt to communicate with the DU using the set of resources. This may result in the wireless node attempting to receive information from the DU when the DU is not transmitting, which may result in the wireless node consuming power or determining that the link has failed. Further, the wireless node may attempt to transmit information to the DU, but the DU may not receive the information or may detect interference when receiving another communication.

A proposed solution provides a slot configuration framework that may allow a resource to be labeled as unavailable (e.g., in addition to being labelable as an uplink resource, a downlink resource, or a flexible resource), thereby informing the UE that the UE is not to attempt to communicate with the DU using the resource. However, extending the slot configuration framework, as in the proposed solution, may prevent backward compatibility with previous versions of wireless nodes that are not configured for new types of resource labeling.

Thus, in one or more examples, rather than explicitly labeling a resource as unavailable under an extended slot configuration framework, the resource may be labeled in a particular existing manner in a current slot configuration framework, and a wireless node may be configured to implicitly derive that the resource is unavailable based at least in part on the particular manner of labeling. For example, the wireless node may be configured to interpret a resource as unavailable when the resource is labeled as flexible in both a slot assignment message (e.g., a time-division-duplexing uplink downlink configuration message (TDD-UL-DL configuration message, such as a TDD-UL-DL configCommon or TDD-UL-DL configDedicated)) and a slot format indicator (SFI) message. Similarly, if a resource is labeled as a flexible resource in the slot assignment message and as a downlink resource in the SFI message, the wireless node may avoid semi-statically configured uplink communications on the resource. In this way, the wireless node may ensure efficient power utilization, interference-free or interference-reduced communication, accurate link state determination, a combination thereof, and/or the like.

In one or more examples, a slot assignment message (e.g., a TD-UL-DL configuration message) and an SFI message may be separately configured by a CU and a DU, respectively. As a result, the CU and the DU may perform separate determinations regarding whether a particular resource is to be identified in a particular manner that is interpretable by the wireless node as indicating that the particular resource is unavailable to the DU.

Some aspects described herein enable resource availability indication. For example, a CU, a DU, and a wireless node may be configured to communicate to determine that a particular resource is unavailable to the DU. As an example, the CU may transmit information to the DU indicating that a particular resource is unavailable and the DU may further transmit the information to the wireless node. In some cases, the wireless node may receive an updated slot format indicator (e.g., from the DU), which may indicate to the wireless node that the wireless node is to refrain from using the particular resource. In this way, by using the slot format indicator to indicate that a particular resource is not available to the DU, the CU and DU may ensure that the wireless node is able to determine that a particular resource is unavailable, thereby improving power utilization efficiency, enabling interference-free or interference-reduced communication, enabling accurate link state determination, a combination thereof, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS and a CU for a macro cell 102a, a BS 110b may be a pico BS for a pico cell 102b, a BS 110c may be a femto BS for a femto cell 102c, and a BS 110d may be a DU for the macro cell. In one or more examples, BS 110d may represent an inferior node of BS 110a and a superior node of UE 120e, and UE 120e may represent an inferior node of BS 110d. A BS may support one or multiple (e.g., three) cells. The terms "eNB", "base station", "NR BS", "gNB", "TRP", "AP", "node B", "5G NB", and "cell" may be used interchangeably herein.

Although BS 110a (e.g., a CU) and BS 110d are depicted separate base stations, a single base station may include both a CU and one or more DUs. For example, BS 110a and BS 110d may be a single base station that includes a CU and a DU that interact as described herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station BS 110d, which may be a DU, may communicate with macro BS 110a and a UE 120e in order to facilitate communication between BS 110a and UE 120e. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, a central unit (CU), such as BS 110a, may include a communication manager 140. As described in more detail elsewhere herein, the communication manager 140 may determine a set of resources that is unavailable for use by a DU of the CU, the set of resources including one or more resources; and transmi information identifying the set of resources that is unavailable for use by the DU to cause an inferior node of the DU to refrain from using the set of resources that is unavailable for use by the DU. Additionally, or alternatively, the communication manager 140 may perform one or more other operations described herein.

Similarly, a DU, such as the BS 110d, may include a communication manager 150. As described in more detail elsewhere herein, the communication manager 150 may determine a set of resources that is unavailable to the DU, the set of resources including one or more resources; and transmit, to an inferior node of the DU, signaling identifying the set of resources that is unavailable for the DU to cause the inferior node to refrain from using the set of resources. Additionally, or alternatively, the communication manager 150 may perform one or more other operations described herein.

Similarly, a UE, such as the UE 120e, may include a communication manager 160. As described in more detail elsewhere herein, the communication manager 160 may receive signaling identifying a set of resources that is unavailable for a DU that is a superior node to the UE, the set of resources including one or more resources; and refrain from using the set of resources based at least in part on receiving the signaling. Additionally, or alternatively, the communication manager 160 may perform one or more other operations described herein.

As indicated above, FIG. 1 is provided merely as an example. Other examples may differ from what is described with regard to FIG. 1.

Figure 2:
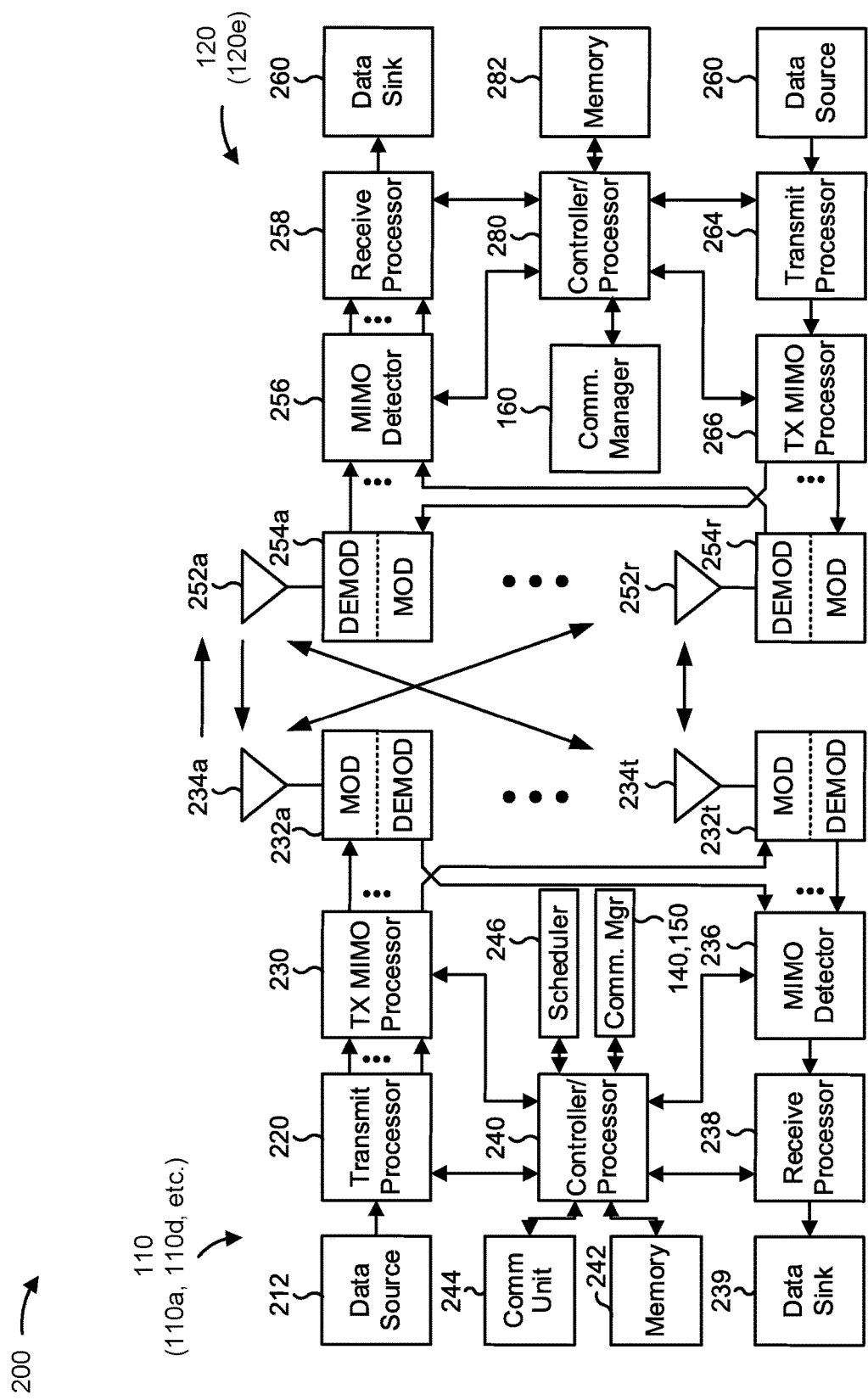
FIG. 2 is a block diagram conceptually illustrating an example of one or more base stations in communication with a UE in a wireless communication network, in accordance with various aspects of the present disclosure.

FIG. 2 shows a block diagram of a design 200 of one or more base stations 110 (e.g., BS 110*a*, BS 110*d*, etc., referred to with regard to this figure as base station 110) and a UE 120 (e.g., UE 120*e*). Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244.

Controller/processor 240 of base station 110, controller/processor 280 of UE 120, and/or any other component(s) of FIG. 2 may perform one or more techniques associated with resource availability indication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, the base station 110 (e.g., a CU, such as BS 110*a*) may include means for determining a set of resources that is unavailable for use by a DU of base station 110, the set of resources including one or more resources, means for transmitting information identifying the set of resources that is unavailable for use by the DU to cause an inferior node of the DU to refrain from using the set of resources that is unavailable for use by the DU, and/or the like. Additionally, or alternatively, the base station 110 may include means for performing one or more other operations described herein. In some aspects, such means may include the communication manager 140. In some aspects, such means may include one or more components of the base station 110 described in connection with FIG. 2.

In some aspects, the UE 120 may include means for receiving signaling identifying a set of resources that is unavailable for a distributed unit (DU) that is a superior node to the wireless node, the set of resources including one or more resources, means for refraining from using the set of resources based at least in part on receiving the signaling, and/or the like. Additionally, or alternatively, the UE 120 may include means for performing one or more other operations described herein. In some aspects, such means may include the communication manager 160. Additionally, or alternatively, such means may include one or more components of the UE 120 described in connection with FIG. 2.

In some aspects, the base station 110 (e.g., a DU, such as BS 110*d*) may include means for determining a set of resources that is unavailable to the base station 110, the set of resources including one or more resources, means for transmitting, to an inferior node of the base station 110, signaling identifying the set of resources that is unavailable for the base station 110 to cause the inferior node to refrain from using the set of resources and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

Figure 3A:
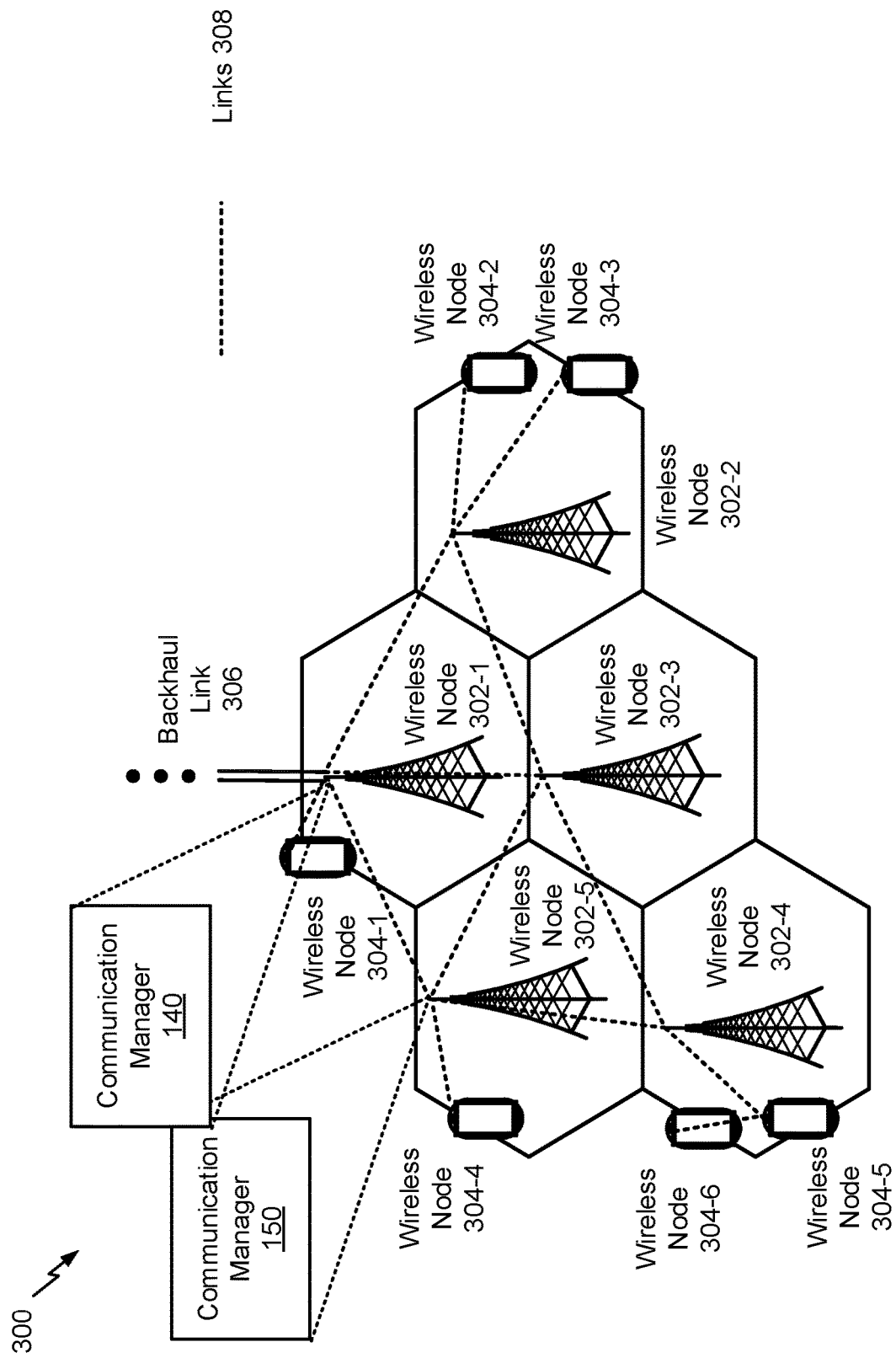
FIGS. 3A and 3B are diagrams illustrating an example of a network topology for a multi-hop network, in accordance with various aspects of the present disclosure.
Figure 3B:
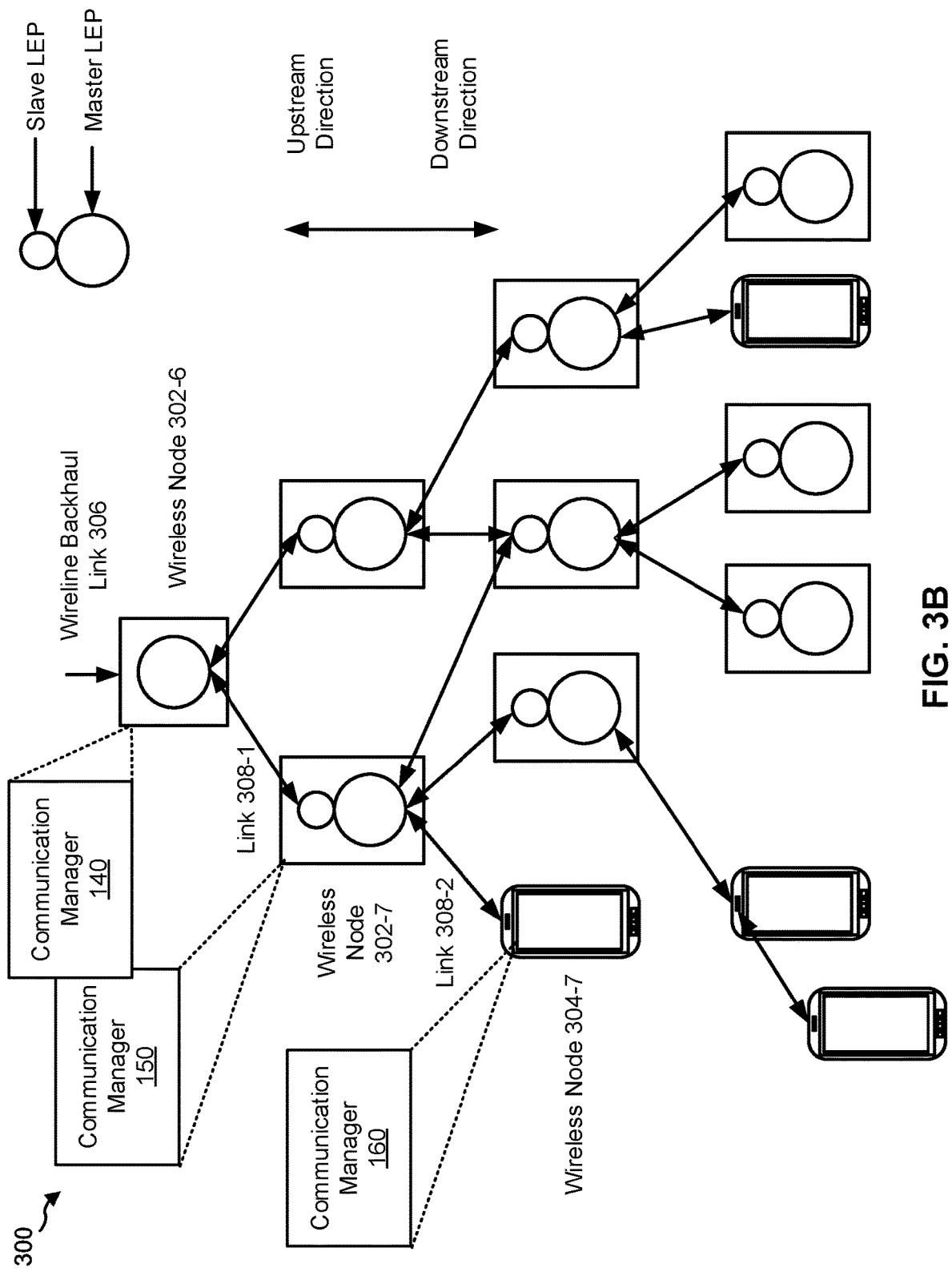

FIGS. 3A and 3B are diagrams illustrating an example 300 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., BS 110*a*, BS 110*d*, and/or the like) may communicate backhaul traffic via first mmWave resources with a second wireless node and may communicate access traffic via second mmWave resources with a third wireless node. Although some aspects, described herein, are described in terms of an IAB deployment, some aspects described herein may be used in connection with other types of multi-hop networks.

As shown in FIG. 3A, example 300 may include multiple wireless nodes 302 (e.g., BSs) and multiple wireless nodes 304 (e.g., UEs). At least one wireless node (e.g., wireless node 302-1, which may be a CU, such as BS 110*a*) may communicate with a core network via a backhaul link 306, such as a fiber connection, a wireless backhaul connection, a combination thereof, and/or the like. Wireless nodes 302 and 304 may communicate with each other using a set of links 308, such as a set of mmWave links; a 3G, 4G, 5G, etc. air interface; and/or the like.

As further shown in FIG. 3A, one or more wireless nodes 302 or 304 may communicate indirectly via one or more other wireless nodes 302 or 304. For example, data may be transferred from a core network to wireless node 304-4 via backhaul link 306, a link 308 between wireless node 302-1 (e.g., BS 110*a*) and wireless node 302-5 (e.g., which may be a DU, such as BS 110*d*), and a link 308 between wireless node 302-5 and wireless node 304-4 (e.g., which may be a UE, such as UE 120*e*).

As shown in FIG. 3B, wireless nodes 302 and wireless nodes 304 can be arranged in a hierarchical topology to enable management of network resources. Each link 308 may be associated with a master link end point (master LEP) and a slave link end point (slave LEP), which may define a hierarchy between wireless nodes 302 or 304. For example, a wireless node 302-6 (e.g., which may be a CU, such as BS 110*a*) may communicate with a wireless node 302-7 (e.g., which may be a DU, such as BS 110*d*, that is a child node or inferior node of wireless node 302-6) via link 308-1, which may be a parent link for wireless node 302-7. Similarly, wireless node 302-7 may communicate with wireless node 304-7 (e.g., which may be a UE, such as UE 120*e*, which may be a child node or inferior node of wireless node 302-7) via link 308-2, which may be a child link for wireless node 302-7. Wireless node 302-6 may schedule for wireless node 302-7, which may schedule for wireless node 304-7 based at least in part on the hierarchy defined herein.

As indicated above, FIGS. 3A and 3B are provided as examples. Other examples are possible and may differ from what was described with respect to FIGS. 3A and 3B.

Figure 4:
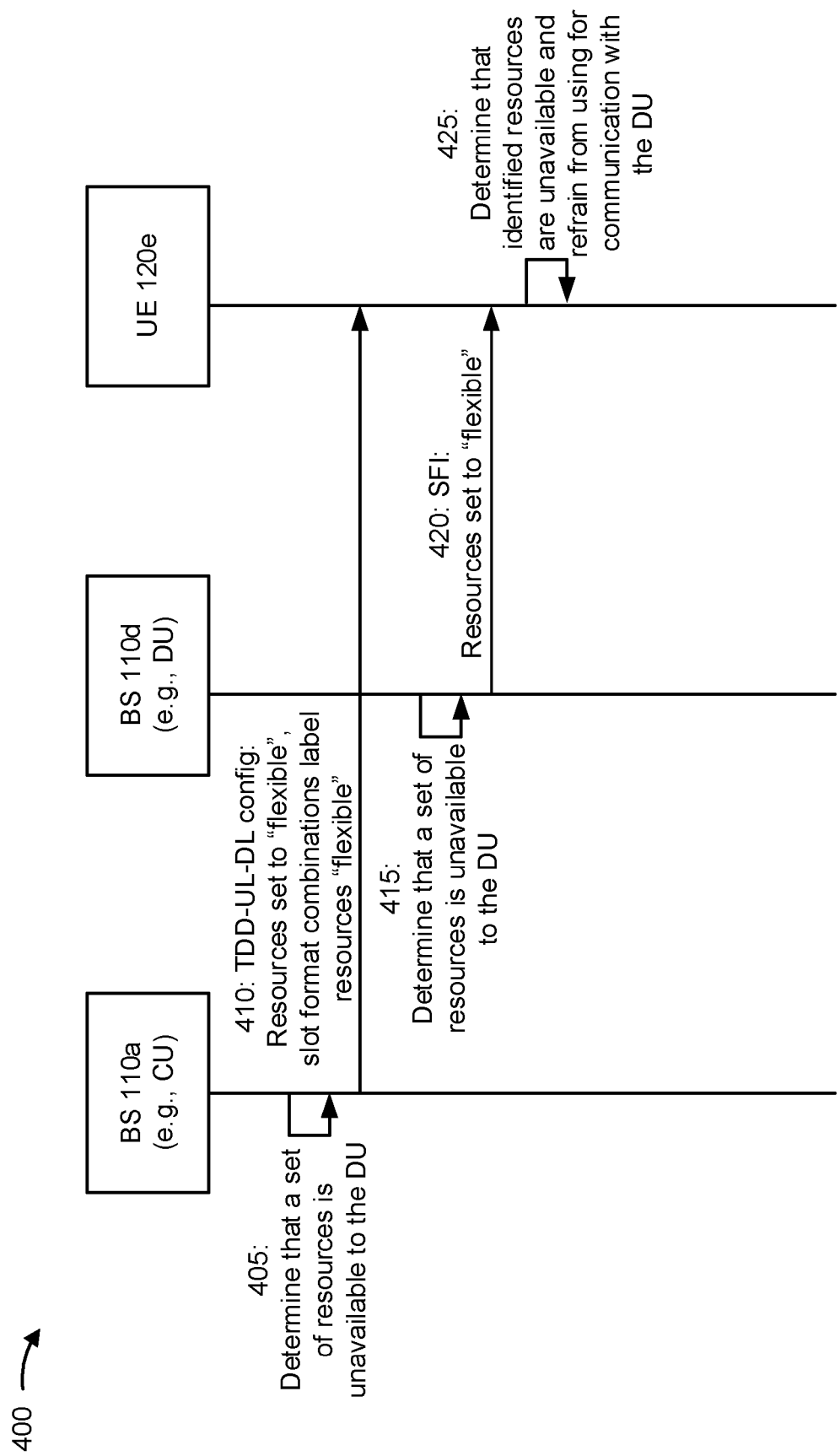
FIGS. 4-6 are diagrams illustrating examples of resource availability indication, in accordance with various aspects of the present disclosure.

FIG. 4 is a diagram illustrating an example 400 of resource availability indication, in accordance with various aspects of the present disclosure. As described above, although the CU and the DU are depicted as belonging to separate base stations, the CU and the DU may be implemented as a single base station that includes a CU and one or more DUs (e.g., a single BS 110 may include both BS 110*a* and BS 110*d*).

As shown in FIG. 4, and by reference number 405, BS 110*a* may determine a set of resources that are not available to BS 110*d*. For example, BS 110*a* may determine that the set of resources (e.g., one or more resources) is not to be assigned to BS 110*d* for use. Additionally, or alternatively, BS 110*a* may determine not to release the set of resources to BS 110*d* for use.

As further shown in FIG. 4, and by reference number 410, BS 110*a* may transmit a slot assignment message to indicate that the set of resources is unavailable to the BS 110*d*. For example, BS 110*a* may transmit a TDD-UL-DL configuration message, such as a TDD-UL-DL configCommon or a TDD-UL-DL configDedicated, toward UE 120*e* (e.g., directly to UE 120*e*, directly to BS 110*d* to cause BS 110*d* to further transmit signaling to UE 120*e*, and/or the like) to indicate that the set of resources is unavailable to BS 110*d*. In some aspects, BS 110*a* may indicate a particular slot assignment to indicate that the set of resources is unavailable to BS 110*d*. For example, BS 110*a* may identify the set of resources as flexibly assigned which, when combined with BS 110*d* identifying the set of resources as flexibly assigned using an SFI as described herein, may enable UE 120*e* to infer that the set of resources are unavailable to BS 110*d*.

In some aspects, BS 110*a* may transmit a message to BS 110*d*. For example, BS 110*a* may determine and indicate one or more slot format configurations that includes flexibly assigned resources corresponding to the set of resources. BS 110*d* may transmit an SFI that uses a slot format configuration of the one or more slot format configurations. In this way, BS 110*a* enables BS 110*d* to transmit an SFI that indicates that the set of resources is unavailable to BS 110*d*.

As further shown in FIG. 4, and by reference number 415, BS 110*d* may determine that the set of resources is unavailable to BS 110*d*. For example, BS 110*d* may determine that BS 110*a* has not allocated the set of resources to BS 110*d*. Additionally, or alternatively, BS 110*d* may determine that BS 110*a* has not released the set of resources to BS 110*d*.

As further shown in FIG. 4, and by reference number 420, BS 110*d* may transmit a message to UE 120*e* to indicate that the set of resources is unavailable to BS 110*d*. For example, BS 110*d* may transmit an SFI message in which the set of resources are assigned as flexibly assigned resources (e.g., for use as uplink resources or downlink resources). In this way, when combined with BS 110*a* identifying the set of resources as flexibly assigned resource, BS 110*d* may indicate to UE 120*e* that the set of resources is unavailable to BS 110*d*. Although some aspects are described in terms of a particular assignment resulting in an inference that resources are unavailable, other types of assignments may be configured to enable the inference that resources are unavailable.

As further shown in FIG. 4, and by reference number 425, UE 120*e* may receive the TDD-UL-DL configuration message and the SFI message and may determine that the set of resources is unavailable to BS 110*d*. For example, UE 120*e* may determine that the set of resources are unavailable based at least in part on both the TDD-UL-DL configuration message and the SFI indicating that the set of resources are flexibly assigned. UE 120*e* may refrain from using the set of resources for communication with BS 110*d*. For example, UE 120*e* may refrain from attempting to receive a transmission from BS 110*d*. In this way, UE 120*e* reduces a utilization of power resources, avoids incorrectly determining that a link failure has occurred for a link between BS 110*d* and UE 120*e*, and/or the like. Additionally, or alternatively, UE 120*e* may refrain from attempting to transmit to BS 110*d*. In this way, UE 120*e* reduces a utilization of power resources, avoids incorrectly determining that a link failure has occurred, reduces interference, and/or the like.

As indicated above, FIG. 4 is provided as an example. Other examples may differ from what is described with respect to FIG. 4.

Figure 5:
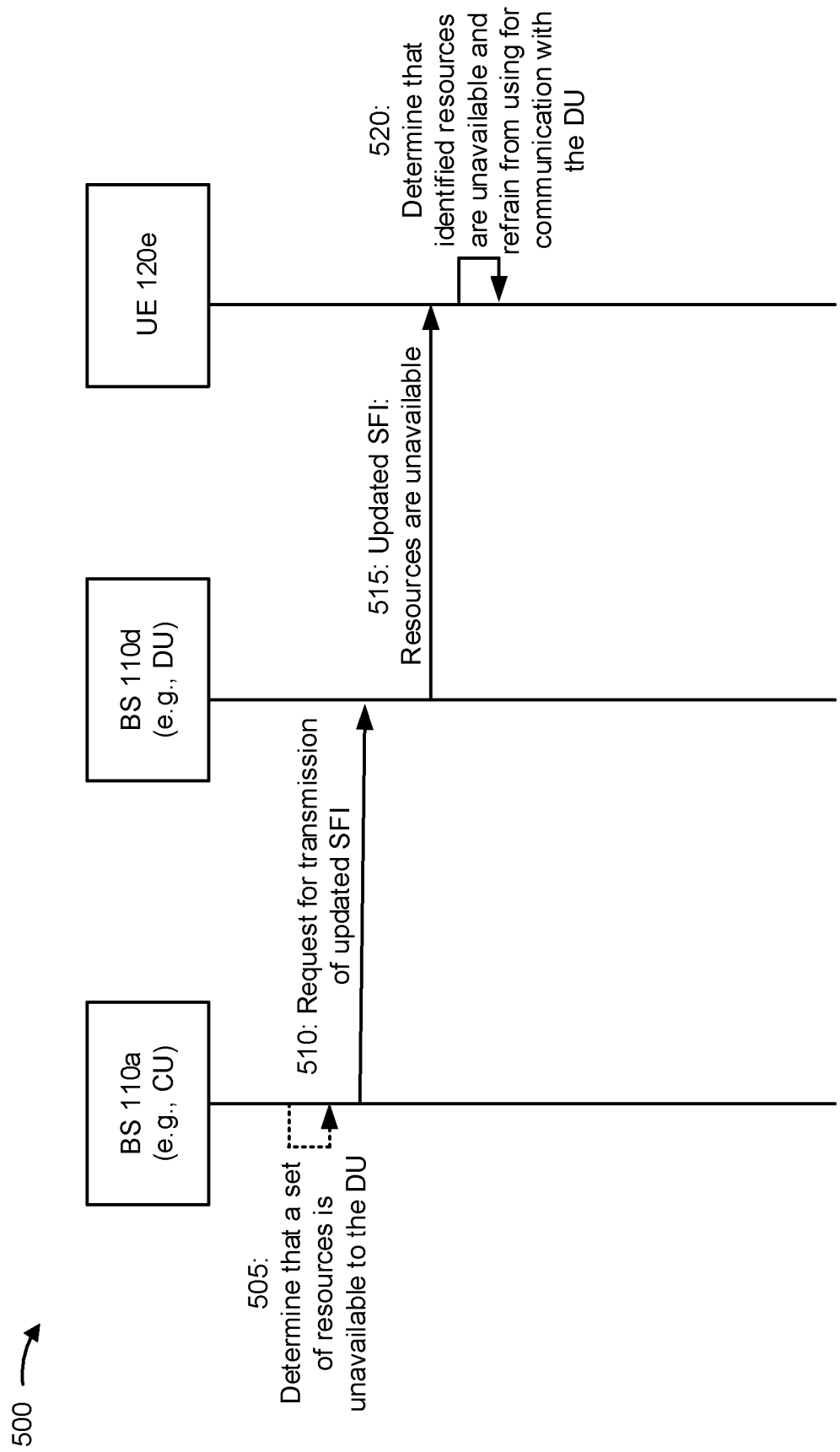

FIG. 5 is a diagram illustrating an example 500 of resource availability indication, in accordance with various aspects of the present disclosure. As described above, although the CU and the DU are depicted as belonging to separate base stations, the CU and the DU may be implemented as a single base station that includes a CU and one or more DUs (e.g., a single BS 110 may include both BS 110*a* and BS 110*d*).

As shown in FIG. 5, and by reference number 505, in some aspects, BS 110*a* may determine a set of resources that are not available to BS 110*d*. For example, BS 110*a* may determine that the set of resources is unavailable to BS 110*d*, as described above. BS 110*a* may transmit a message to BS 110*d* to trigger BS 110*d* to transmit an updated SFI to indicate to UE 120*e* that the set of resources is unavailable to BS 110*d*, as described in more detail herein.

As further shown in FIG. 5, and by reference number 510, BS 110*a* may transmit a message to cause BS 110*d* to transmit an updated SFI to indicate that the set of resources is unavailable to BS 110*d*. For example, BS 110*a* may transmit a message toward UE 120*e* (e.g., to BS 110*d* to cause BS 110*d* to further transmit to UE 120*e*) based at least in part on determining that the set of resources is unavailable to BS 110*d*. In contrast, in some aspects, BS 110*a* may transmit the message to BS 110*d* without determining a set of resources that are not available to BS 110*d*. For example, BS 110*a* may transmit the message to request that BS 110*d* transmit an updated SFI when BS 110*d* determines that a set of resources is unavailable to BS 110*d* rather than when BS 110*a* determines that the set of resources is unavailable to BS 110*d*. In this way, BS 110*d* may account for soft release of resources in determining whether a set of resources is available to BS 110*d* or is unavailable to BS 110*d*.

In some aspects, BS 110*a* may trigger BS 110*d* to transmit the updated SFI when a set of resources becomes available or unavailable for a particular subset of inferior nodes of BS 110*d*. For example, BS 110*a* may indicate that BS 110*d* is to transmit the updated SFI to UE 120*e* and not to one or more other UEs 120 or MTs that are inferior nodes of BS 110*d*. BS 110*a* may indicate a set of SFI-radio network temporary identifiers (SFI-RNTIs) for which BS 110*d* is to transmit an updated SFI, which may correspond to one or more UEs 120 (e.g., UE 120*e*) and/or MTs.

Similarly, in some aspects, BS 110*a* may trigger BS 110*d* to transmit the updated SFI when a particular subset of resources becomes available or unavailable. For example, BS 110*a* may indicate that BS 110*d* is to transmit an updated SFI to indicate that a resource within a configured set of resources (e.g., soft-releasable resources or another subset of resources) is unavailable to BS 110*d*. In some aspects, BS 110*a* may indicate a particular slot format to indicate in the updated SFI. For example, BS 110*a* may transmit the message to identify the particular slot format that BS 110*d* is to use to indicate to UE 120*e* that a particular resource is unavailable to BS 110*d*.

As further shown in FIG. 5, and by reference number 515, BS 110*d* may transmit the updated SFI to indicate that the set of resources is unavailable to BS 110*d*. For example, BS 110*d* may transmit the updated SFI to UE 120*e*, to a particular subset of UEs 120 and/or MTs, and/or the like, as described above. In some aspects, BS 110*d* may transmit the updated SFI based at least in part on determining that the set of resources are unavailable. Additionally, or alternatively, BS 110*d* may transmit the updated SFI based at least in part on receiving the message from BS 110*a* indicating that BS 110*d* is to transmit the updated SFI.

In some aspects, BS 110*d* may transmit the updated SFI at a particular time. For example, BS 110*d* may receive allocated resources for transmitting a downlink control information (DCI) format type 2-0 and may use the DCI format type 2-0 to convey the updated SFI. BS 110*a* may indicate, to BS 110*d*, that BS 110*d* is to transmit the updated SFI in a next available DCI format type 2-0 resource, a particular identified DCI format type 2-0 resource, and/or the like. BS 110*a* and/or BS 110*d* may select a resource for transmitting the updated SFI based at least in part on a DU capability (e.g., of BS 110*d*), a processing latency, a resource availability, and/or the like. For example, when BS 110*d* receives F1-AP signaling identifying that a particular resource is unavailable, additional processing time associated with the F1-AP signaling (e.g., relative to other signaling) may be accounted for in selecting a resource with which to transmit the updated SFI. Additionally, or alternatively, BS 110*d* may select a resource for transmitting the updated SFI based at least in part on a stored configuration.

In some aspects, BS 110*d* may transmit, to BS 110*a*, a capability indicator to enable BS 110*a* to determine a resource for BS 110*d* to transmit the updated SFI. For example, BS 110*a* may determine a minimum processing time for processing a release/reclaim command associated with soft releasable resources and may determine the resource for transmitting the updated SFI based at least in part on the minimum processing time. In one or more examples, BS 110*a* may configure control resource set (CORESET) resources based at least in part on a processing time of BS 110*d*, and may allocate the configured CORESET resources to BS 110*d*.

As further shown in FIG. 5, and by reference number 520, UE 120*e* may determine that the set of resources is unavailable to BS 110*d* and may refrain from using the set of resources for communication with BS 110*d*. For example, based at least in part on receiving the updated SFI, UE 120*e* may determine that the set of resources is unavailable to BS 110*d* and may refrain from attempting to receive transmissions from or attempting to transmit messages to BS 110*d*.

As indicated above, FIG. 5 is provided as an example. Other examples may differ from what is described with respect to FIG. 5.

Figure 6:
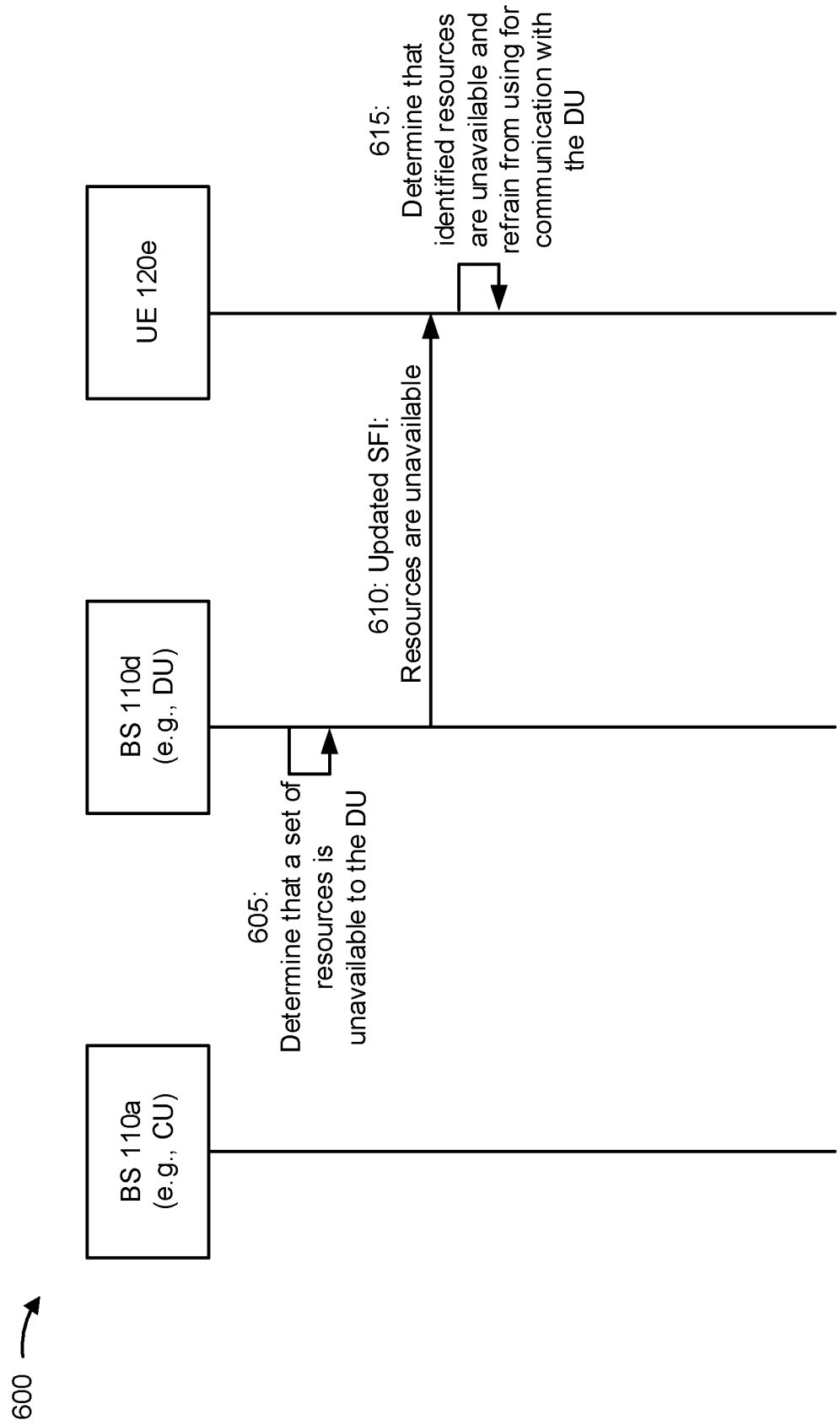

FIG. 6 is a diagram illustrating an example 600 of resource availability indication, in accordance with various aspects of the present disclosure. As described above, although the CU and the DU are depicted as belonging to separate base stations, the CU and the DU may be implemented as a single base station that includes a CU and one or more DUs (e.g., a single BS 110 may include both BS 110*a* and BS 110*d*).

As shown in FIG. 6, and by reference number 605, BS 110*d* may determine that a set of resources is unavailable to BS 110*d*. For example, BS 110*d* may determine that BS 110*a* has not allocated the set of resources to BS 110*d* for use, has not soft released the set of resources to BS 110*d* for use, and/or the like, as described in more detail above. In some aspects, BS 110*d* may determine that BS 110*a* has allocated resources to another device (e.g., another BS 110 or UE 120) and may determine that BS 110*a* has not allocated resources to BS 110*d* based at least in part on determining that BS 110*a* has allocated resources to the other device.

As further shown in FIG. 6, and by reference number 610, BS 110*d* may transmit an updated SFI to UE 120*e* to indicate that the set of resources is unavailable for us by BS 110*d*. For example, BS 110*d* may transmit the updated SFI based at least in part on a stored configuration of BS 110*d* rather than based at least in part on receiving a request to transmit the updated SFI from BS 110*a*. In this way, an amount of signaling overhead is reduced relative to BS 110*a* configuring updated SFI transmission. In one or more examples, the stored configuration may indicate that BS 110*d* is to transmit the updated SFI for a particular subset of resources, a particular subset of inferior nodes (e.g., UE 120*e*, one or more other UEs 120, one or more MTs), and/or the like.

As further shown in FIG. 6, and by reference number 615, UE 120*e* may determine that the set of resources is unavailable for use by BS 110*d* and may refrain from communication with BS 110*d*. For example, based at least in part on receiving the updated SFI, UE 120*e* may determine to refrain from attempting to transmit to and/or attempting to receive from BS 110*d*, as described in more detail above.

As indicated above, FIG. 6 is provided as an example. Other examples may differ from what is described with respect to FIG. 6.

Figure 7:
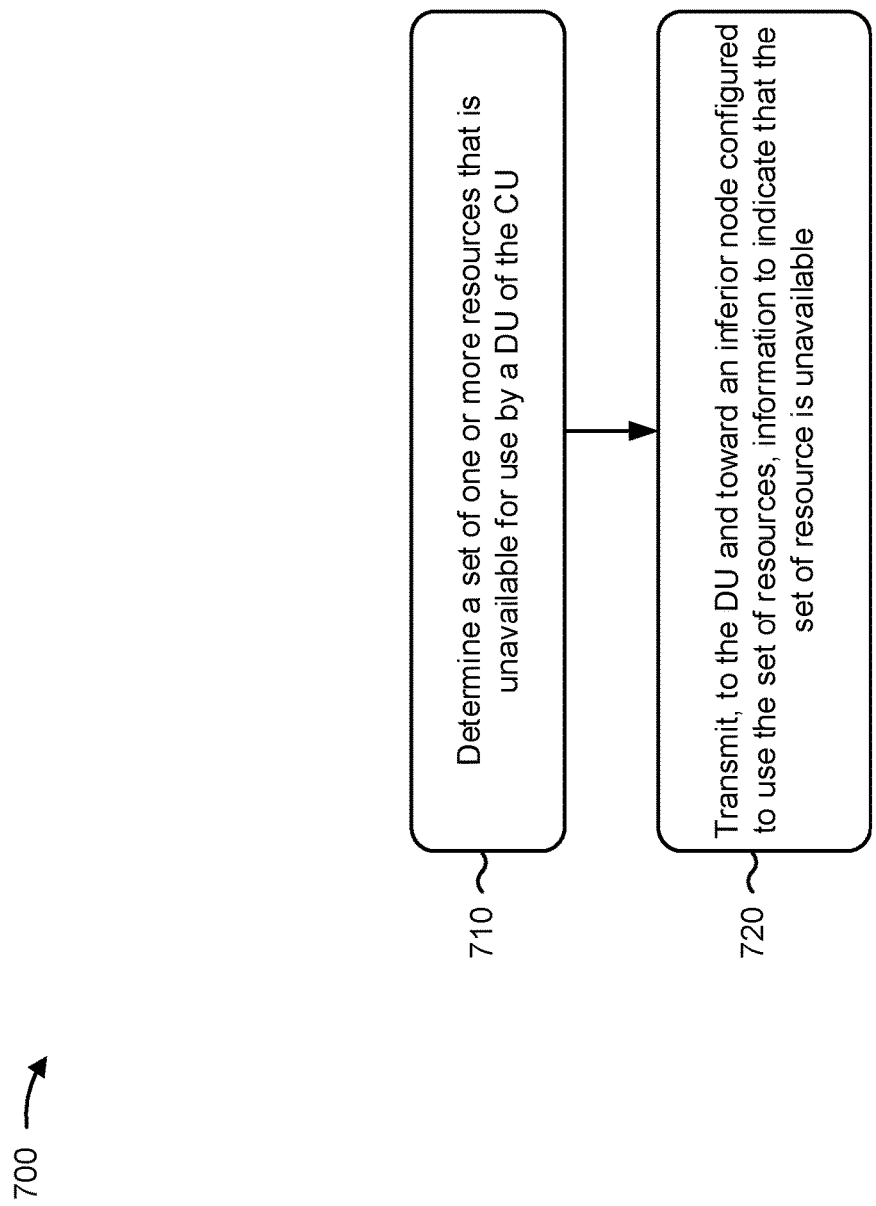
FIG. 7 is a diagram illustrating an example process performed, for example, by a CU, in accordance with various aspects of the present disclosure.

FIG. 7 is a diagram illustrating an example process 700 performed, for example, by a CU, in accordance with various aspects of the present disclosure. Example process 700 is an example where a CU (e.g., BS 110*a* and/or the like) performs operations associated with resource availability indication.

As shown in FIG. 7, in some aspects, process 700 may include determining a set of one or more resources that is unavailable for use by a distributed unit (DU) of the CU (block 710). For example, the CU (e.g., using transmit processor 220, receive processor 238, controller/processor 240, memory 242, and/or the like) may determine a set of one or more resources that is unavailable for use by a distributed unit (DU) of the CU, as described above.

As further shown in FIG. 7, in some aspects, process 700 may include transmitting, to the DU and toward an inferior node configured to use the set of resources, information to indicate that the set of resources is unavailable (block 720). For example, the CU (e.g., using transmit processor 220, receive processor 238, controller/processor 240, memory 242, and/or the like) may transmit, to the DU and toward an inferior node configured to use the set of resources, information to indicate that the set of resources is unavailable, as described above.

Process 700 may include additional aspects, such as any single implementation or any combination of aspects described below and/or in connection with one or more other processes described elsewhere herein.

In a first aspect, transmitting the information includes transmitting a dedicated slot allocation configuration message to the inferior node. In a second aspect, alone or in combination with the first aspect, the dedicated slot allocation configuration message identifies the set of resources that is unavailable for use by the DU as flexibly assigned resources. In a third aspect, alone or in combination with any one or more of the first and second aspects, the inferior node is a user equipment (UE) or a mobile terminal (MT).

In a fourth aspect, alone or in combination with any one or more of the first through third aspects, transmitting the information includes transmitting a signal to the DU to cause the DU to transmit an updated slot format indicator (SFI) to the inferior node. In a fifth aspect, alone or in combination with any one or more of the first through fourth aspects, process 700 includes transmitting an indicator to indicate a resource for the DU to transmit the updated SFI. In a sixth aspect, alone or in combination with any one or more of the first through fifth aspects, the resource is identified explicitly by a resource indicator or implicitly by a parameter indicating a requirement for a time to transmit the updated SFI. In a seventh aspect, alone or in combination with any one or more of the first through sixth aspects, the resource is determined based at least in part on at least one of a DU capability, a processing latency, a downlink control information (DCI) preparation latency, a resource release latency, a resource reclaim latency, or a combination thereof.

In an eighth aspect, alone or in combination with any one or more of the first through seventh aspects, transmitting the signal includes transmitting the signal based at least in part on an identifier of the inferior node. In a ninth aspect, alone or in combination with any one or more of the first through eighth aspects, transmitting the signal includes transmitting the signal based at least in part on the set of resources including at least one of an unavailable resource, a soft assigned resource, or a combination thereof. In a tenth aspect, alone or in combination with any one or more of the first through ninth aspects, transmitting the signal includes transmitting an indicator of a slot format to include in the updated SFI.

In an eleventh aspect, alone or in combination with one or more of the first through tenth aspects, the information to indicate that the set of resources is unavailable includes an indicator that each resource, of a plurality of resources that includes the set of resources, is for one of: downlink assignment, flexible assignment, or uplink assignment. In a twelfth aspect, alone or in combination with one or more of the first through eleventh aspects, wherein the flexible assignment indicates that a resource, of the set of resources, is unavailable. In a thirteenth aspect, alone or in combination with one or more of the first through twelfth aspects, the set of resources is unavailable for use for one or more types of communications. In a fourteenth aspect, alone or in combination with one or more of the first through thirteenth aspects, process 700 may include transmitting semi-static signaling identifying the one or more types of communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
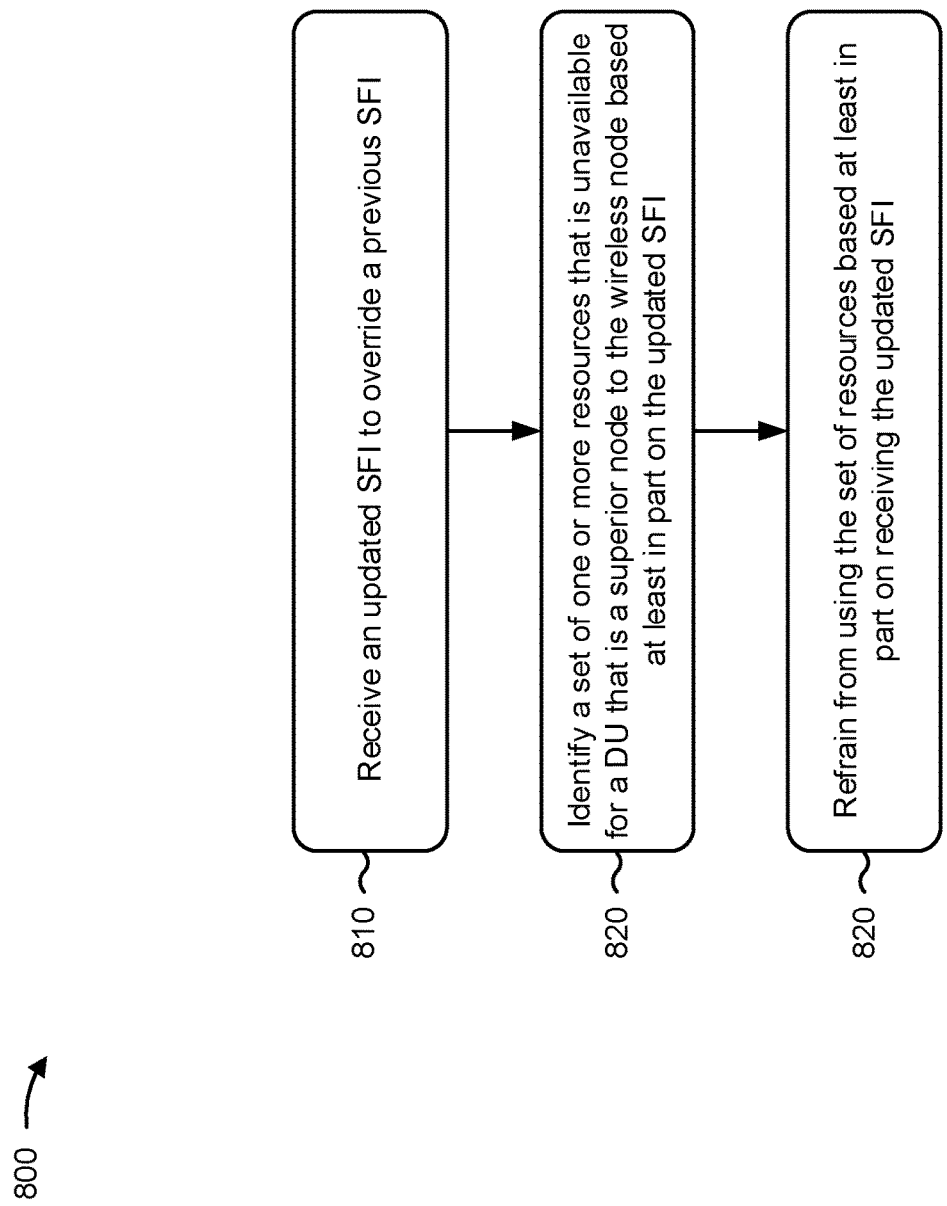
FIG. 8 is a diagram illustrating an example process performed, for example, by a wireless node (e.g., a UE), in accordance with various aspects of the present disclosure.

FIG. 8 is a diagram illustrating an example process 800 performed, for example, by a wireless node, in accordance with various aspects of the present disclosure. Example process 800 is an example where a wireless node (e.g., UE 120 and/or the like) performs operations associated with resource availability indication.

As shown in FIG. 8, in some aspects, process 800 may include an updated slot format indicator (SFI) to override a previous SFI (block 810). For example, the wireless node (e.g., using receive processor 258, transmit processor 264, controller/processor 280, memory 282, and/or the like) may receive an updated slot format indicator (SFI) to override a previous SFI, as described above.

As shown in FIG. 8, in some aspects, process 800 may identifying a set of one or more resources that is unavailable for a distributed unit (DU) that is a superior node to the wireless node based at least in part on the updated SFI (block 820). For example, the wireless node (e.g., using receive processor 258, transmit processor 264, controller/processor 280, memory 282, and/or the like) may identify a set of one or more resources that is unavailable for a distributed unit (DU) that is a superior node to the wireless node based at least in part on the updated SFI, as described above.

As further shown in FIG. 8, in some aspects, process 800 may include refraining from using the set of resources based at least in part on receiving the updated SFI (block 830). For example, the wireless node (e.g., using receive processor 258, transmit processor 264, controller/processor 280, memory 282, and/or the like) may refrain from using the set of resources based at least in part on receiving the updated SFI, as described above.

Process 800 may include additional aspects, such as any single implementation or any combination of aspects described below and/or in connection with one or more other processes described elsewhere herein.

In a first aspect, receiving the previous SFI includes receiving, from a central unit (CU), first signaling identifying the set of resources as flexible resources, the first signaling being a dedicated slot allocation configuration message; and receiving, from the DU, the updated SFI identifying the set of resources as flexible resources, the second signaling being a slot format indicator (SFI). In a second aspect, alone or in combination with the first aspect, the wireless node is a user equipment (UE) or a mobile terminal (MT) that is an inferior node of the DU. In a third aspect, alone or in combination with any one or more of the first and second aspects, receiving the signaling includes receiving, from the DU, an updated slot format indicator (SFI) to override a previous SFI.

In a fourth aspect, alone or in combination with one or more of the first through third aspects, the updated SFI includes an indicator that each resource, of a plurality of resources that includes the set of resources, is for one of: downlink assignment, flexible assignment, or uplink assignment. In a fifth aspect, alone or in combination with one or more of the first through fourth aspects, the flexible assignment indicates that a resource, of the set of resources, is unavailable. In a sixth aspect, alone or in combination with one or more of the first through fifth aspects, the set of resources is unavailable for use for one or more types of communications. In a seventh aspect, alone or in combination with one or more of the first through sixth aspects, process 800 includes receiving semi-static signaling identifying the one or more types of communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a DU, in accordance with various aspects of the present disclosure. Example process 900 is an example where a DU (e.g., BS 110*d* and/or the like) performs operations associated with resource availability indication.

As shown in FIG. 9, in some aspects, process 900 may include determining a set of one or more resources that is unavailable to the DU, the set of resources including one or more resources (block 910). For example, the DU (e.g., using transmit processor 220, receive processor 238, controller/processor 240, memory 242, and/or the like) may determine a set of one or more resources that is unavailable to the DU, the set of resources including one or more resources, as described above.

As further shown in FIG. 9, in some aspects, process 900 may include transmitting, to an inferior node of the DU, signaling identifying the set of resources that is unavailable for the DU to cause the inferior node to refrain from using the set of resources (block 920). For example, the DU (e.g., using transmit processor 220, receive processor 238, controller/processor 240, memory 242, and/or the like) may transmit, to an inferior node of the DU, signaling identifying the set of resources that is unavailable for the DU to cause the inferior node to refrain from using the set of resources, as described above.

Process 900 may include additional aspects, such as any single implementation or any combination of aspects described below and/or in connection with one or more other processes described elsewhere herein.

In a first aspect, transmitting the signaling includes transmitting signaling identifying the set of resources as flexible resources, the signaling being an updated slot format indicator (SFI) that overrides a previous SFI. In a second aspect, alone or in combination with the first aspect process 900 may include receiving, from a CU of the DU, a request to transmit an updated slot format indicator (SFI), and transmitting the signaling may include transmitting the updated SFI based at least in part on receiving the request. In a third aspect, alone or in combination with any one or more of the first and second aspects, transmitting the updated SFI includes transmitting the updated SFI based at least in part on an identifier of the inferior node.

In a fourth aspect, alone or in combination with any one or more of the first through third aspects, transmitting the updated SFI may include transmitting the updated SFI based at least in part on the set of resources including at least one of an unavailable resource, a soft assigned resource that is not released by the CU, or a combination thereof. In a fifth aspect, alone or in combination with any one or more of the first through fourth aspects, process 900 may include determining to transmit the updated SFI based at least in part on a stored configuration, and transmitting the updated SFI may include transmitting the updated SFI to override a previous SFI and indicate whether the set of resources is available. In a sixth aspect, alone or in combination with any one or more of the first through fifth aspects, transmitting the signaling may include transmitting the signaling in a next available downlink control information (DCI) resource after the set of resources becomes unavailable.

In a seventh aspect, alone or in combination with any one or more of the first through sixth aspects, transmitting the signaling may include transmitting the signaling in a resource identified by a central unit (CU) of the DU. In a eighth aspect, alone or in combination with any one or more of the first through seventh aspects, the resource is identified by a resource indicator or by a parameter indicating a requirement for a time to transmit the signaling. In a ninth aspect, alone or in combination with any one or more of the first through eighth aspects, the resource is determined based at least in part on at least one of a DU capability, a processing latency, a downlink control information (DCI) preparation latency, a resource release latency, a resource reclaim latency, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a central unit (CU), comprising:
    determining a set of one or more resources that is unavailable for use by a distributed unit (DU) of the CU; and
    transmitting an indicator to indicate a resource for the DU to transmit an updated slot format indicator (SFI), wherein the resource is identified explicitly by a resource indicator or implicitly by a parameter indicating a requirement for a time to transmit the updated SFI.

2. The method of claim 1, further comprising:
    transmitting information to indicate that the set of resources is unavailable, wherein the information to indicate that the set of resources is unavailable includes an indicator that each resource, of a plurality of resources that includes the set of resources, is for one of: downlink assignment, flexible assignment, or uplink assignment.

3. The method of claim 2, wherein the flexible assignment indicates that a resource, of the set of resources, is unavailable.

4. The method of claim 1, wherein the set of resources is unavailable for use for one or more types of communications.

5. The method of claim 4, further comprising:
    transmitting semi-static signaling identifying the one or more types of communications.

6. The method of claim 1, further comprising:
    transmitting a dedicated slot allocation configuration message to an inferior node configured to use the set of resources.

7. The method of claim 6, wherein the dedicated slot allocation configuration message identifies the set of resources that is unavailable for use by the DU as flexibly assigned resources.

8. The method of claim 1, further comprising:
    transmitting, to the DU and toward an inferior node configured to use the set of resources, information to indicate that the set of resources is unavailable, wherein the inferior node is a user equipment (UE) or a mobile terminal (MT).

9. The method of claim 1, further comprising:
    transmitting a signal to the DU to cause the DU to transmit the updated SFI to an inferior node configured to use the set of resources.

10. The method of claim 9, wherein transmitting the signal comprises:
    transmitting the signal based at least in part on an identifier of the inferior node.

11. The method of claim 9, wherein transmitting the signal comprises:
    transmitting the signal based at least in part on the set of resources including at least one of an unavailable resource, a soft assigned resource, or a combination thereof.

12. The method of claim 9, wherein transmitting the signal comprises:
    transmitting an indicator of a slot format to include in the updated SFI.

13. The method of claim 1, wherein the resource is determined based at least in part on at least one of a DU capability, a processing latency, a downlink control information (DCI) preparation latency, a resource release latency, a resource reclaim latency, or a combination thereof.

14. A method of wireless communication performed by a wireless node, comprising:
    receiving an updated slot format indicator (SFI) to override a previous SFI, wherein the updated SFI indicates that a set of resources is unavailable;
    identifying that the set of resources is unavailable for a distributed unit (DU) that is a superior node to the wireless node based at least in part on the updated SFI; and refraining from using the set of resources based at least in part on receiving the updated SFI.

15. The method of claim 14, wherein the updated SFI includes an indicator that each resource, of a plurality of resources that includes the set of resources, is for one of: downlink assignment, flexible assignment, or uplink assignment.

16. The method of claim 15, wherein the flexible assignment indicates that a resource, of the set of resources, is unavailable.

17. The method of claim 14, wherein the set of resources is unavailable for use for one or more types of communications.

18. The method of claim 17, further comprising:
receiving semi-static signaling identifying the one or more types of communications.

19. The method of claim 14, further comprising:
receiving an indication identifying the set of resources as flexible resources; and
wherein receiving the updated SFI comprises:
receiving the updated SFI identifying the set of resources as flexible resources.

20. The method of claim 14, wherein the wireless node is a user equipment (UE) or a mobile terminal (MT) that is an inferior node of the DU.

21. A method of wireless communication performed by a distributed unit (DU), comprising:
determining a set of one or more resources that is unavailable to the DU; and
transmitting an updated slot format indicator (SFI) to override a previous SFI and indicate that the set of resources is unavailable.

22. The method of claim 21, wherein the updated SFI identifies the set of resources as flexible resources.

23. The method of claim 21, further comprising:
receiving, from a CU of the DU, a request to transmit the updated SFI; and
wherein transmitting the updated SFI comprises:
transmitting the updated SFI based at least in part on receiving the request.

24. The method of claim 21, wherein transmitting the updated SFI comprises:
transmitting the updated SFI based at least in part on an identifier of an inferior node of the DU.

25. The method of claim 21, wherein transmitting the updated SFI comprises:
transmitting the updated SFI based at least in part on the set of resources including at least one of an unavailable resource or a soft assigned resource that is not released by a parent node of the DU.

26. The method of claim 21, further comprising:
determining to transmit the updated SFI based at least in part on a stored configuration.

27. The method of claim 21, wherein transmitting the updated SFI comprises:
transmitting the updated SFI in a next available downlink control information (DCI) resource after the set of resources becomes unavailable.

28. A wireless node for wireless communication, comprising:
a memory; and
one or more processors configured to:
receive an updated slot format indicator (SFI) to override a previous SFI, wherein the updated SFI indicates that a set of resources is unavailable;
identify that the set of resources is unavailable for a distributed unit (DU) that is a superior node to the wireless node based at least in part on the updated SFI; and
refrain from using the set of resources based at least in part on receiving the updated SFI.

29. The wireless node of claim 28, wherein the set of resources is unavailable for use for one or more types of communications.

30. The wireless node of claim 28, wherein the wireless node is a user equipment (UE) or a mobile terminal (MT) that is an inferior node of the DU.

* * * * *